US012059785B2

(12) United States Patent
Dittrich et al.

(10) Patent No.: US 12,059,785 B2
(45) Date of Patent: Aug. 13, 2024

(54) SETTING TOOL

(71) Applicant: HILTI AKTIENGESELLSCHAFT, Schaan (LI)

(72) Inventors: Tilo Dittrich, Feldkirch (AT); Chafic Abu Antoun, Buchs (CH); Peter Bruggmueller, Bludesch (AT)

(73) Assignee: HILTI AKTIENGESELLSCHAFT, Schaan (LI)

( * ) Notice: Subject to any disclaimer, the term of this patent is extended or adjusted under 35 U.S.C. 154(b) by 727 days.

(21) Appl. No.: 15/734,186

(22) PCT Filed: May 29, 2019

(86) PCT No.: PCT/EP2019/063937
§ 371 (c)(1),
(2) Date: Dec. 1, 2020

(87) PCT Pub. No.: WO2019/233846
PCT Pub. Date: Dec. 12, 2019

(65) Prior Publication Data
US 2021/0170559 A1  Jun. 10, 2021

(30) Foreign Application Priority Data
Jun. 6, 2018  (EP) .................................... 18176191

(51) Int. Cl.
*B25C 1/06* (2006.01)
*G01K 7/16* (2006.01)
*B25C 1/00* (2006.01)

(52) U.S. Cl.
CPC .................. *B25C 1/06* (2013.01); *G01K 7/16* (2013.01); *B25C 1/008* (2013.01)

(58) Field of Classification Search
CPC .................................... B25C 1/06; G01K 7/16
See application file for complete search history.

(56) References Cited

U.S. PATENT DOCUMENTS 3,766,455 A * 10/1973 Zakrewsky ............... B25C 1/06
318/135
3,811,313 A *  5/1974 Schut ....................... B21J 15/24
83/575

(Continued)

FOREIGN PATENT DOCUMENTS

CN        201300400 Y       9/2009
JP        S49-19470 A       2/1974
(Continued)

OTHER PUBLICATIONS

International Bureau, International Search Report in International Application No. PCT/EP2019/063937, dated Jun. 26, 2019.

*Primary Examiner* — Lucas E. A. Palmer
(74) *Attorney, Agent, or Firm* — Leydig, Voit & Mayer, Ltd.

(57) ABSTRACT

A setting tool for driving fastening elements into a substrate is provided, the tool comprising a holder for holding a fastening element, a drive-in element, for transferring a fastening element held in the holder into the substrate along a setting axis, and a drive, for driving the drive-in element toward the fastening element along the setting axis, wherein the drive comprises an electrical capacitor, a squirrel-cage rotor arranged on the drive-in element and an excitation coil, which during rapid discharge of the capacitor is flowed through by current and generates a magnetic field that accelerates the drive-in element toward the fastening element, and wherein the setting tool has a means for detecting a temperature of the excitation coil and a control unit which is suitable for controlling an operating sequence of the setting tool in dependence on the detected temperature of the excitation coil.

19 Claims, 3 Drawing Sheets

(56) References Cited

U.S. PATENT DOCUMENTS

Figure 1:
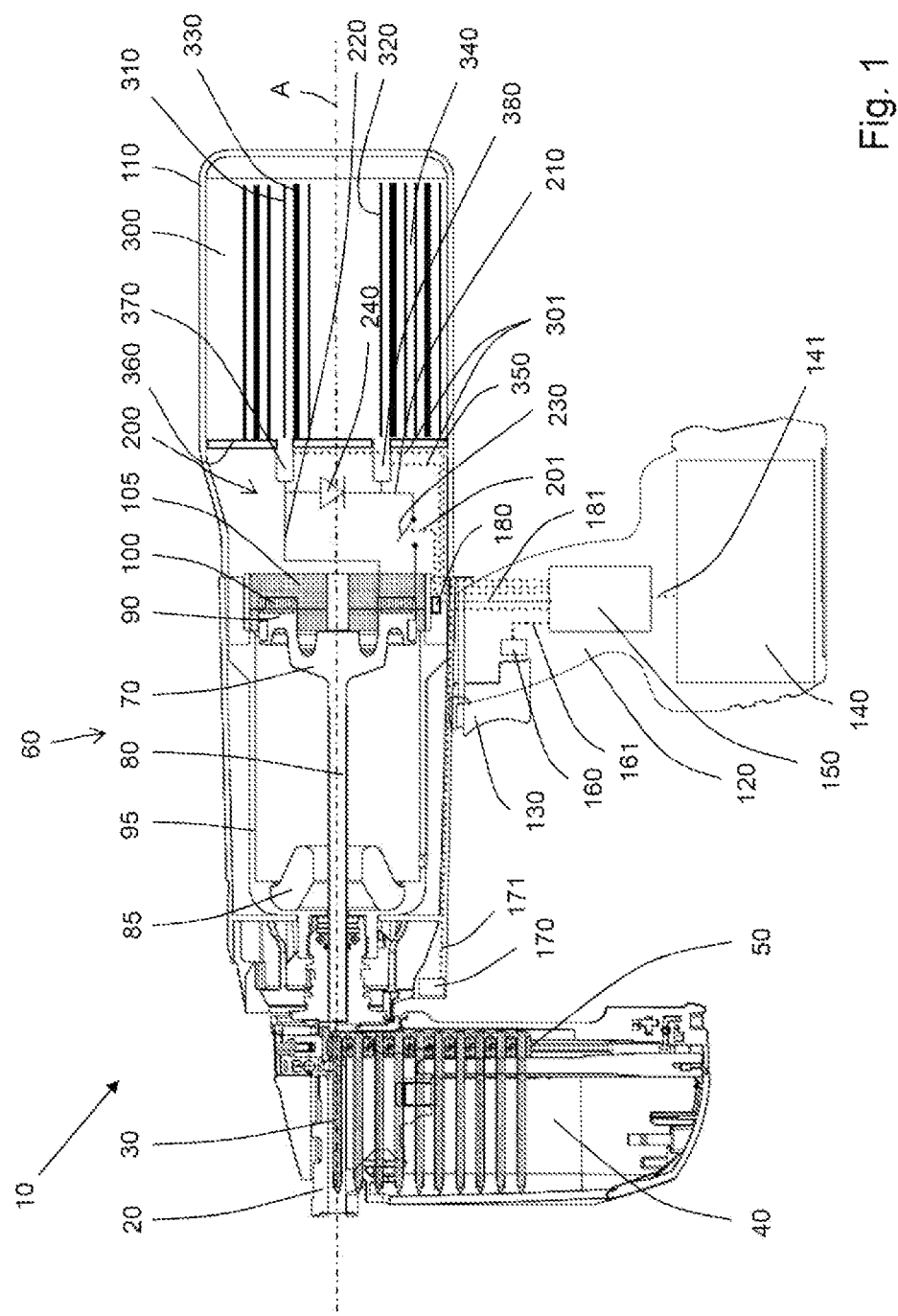

| | | | | |
|---|---|---|---|---|
| 3,924,789 | A * | 12/1975 | Avery | B25C 1/06 227/132 |
| 4,183,453 | A * | 1/1980 | Barrett | B25C 5/15 227/120 |
| 4,215,297 | A * | 7/1980 | Jacquemet | B25D 11/064 318/132 |
| 4,293,088 | A * | 10/1981 | Barrett | B25C 1/06 227/120 |
| 4,573,624 | A * | 3/1986 | Muller | H01F 7/088 227/8 |
| 4,946,087 | A * | 8/1990 | Wingert | B25F 5/02 227/156 |
| 5,079,983 | A * | 1/1992 | Bruhn | B30B 1/42 83/575 |
| 5,280,673 | A * | 1/1994 | Zieve | B21J 15/24 72/430 |
| 5,471,865 | A * | 12/1995 | Michalewski | B21J 15/24 29/243.54 |
| 5,809,157 | A * | 9/1998 | Grumazescu | H04R 9/063 335/229 |
| 6,830,173 | B2 | 12/2004 | Barber et al. | |
| 7,467,739 | B2 | 12/2008 | Fujisawa et al. | |
| 8,104,659 | B2 * | 1/2012 | St. John | G05G 1/10 227/142 |
| 2003/0183670 | A1 * | 10/2003 | Barber | B25C 1/06 227/131 |
| 2005/0167465 | A1 * | 8/2005 | Llewellyn | B25C 5/15 173/117 |
| 2005/0173487 | A1 * | 8/2005 | Moeller | B25C 1/08 227/130 |
| 2006/0065690 | A1 * | 3/2006 | Fujisawa | B25C 1/08 227/10 |
| 2007/0215667 | A1 * | 9/2007 | Huang | B25C 1/00 227/11 |
| 2008/0061105 | A1 * | 3/2008 | Zachrisson | B25C 1/06 320/132 |
| 2008/0179371 | A1 * | 7/2008 | Gardner | B25C 5/15 227/1 |
| 2008/0185418 | A1 * | 8/2008 | Gross | B25C 1/06 173/90 |
| 2008/0272170 | A1 * | 11/2008 | Huang | B25C 1/06 227/107 |
| 2010/0030510 | A1 * | 2/2010 | Koehler | G01K 7/16 702/133 |
| 2010/0032468 | A1 * | 2/2010 | Gross | B25C 1/06 227/156 |
| 2011/0303718 | A1 * | 12/2011 | Spasov | B25F 5/006 165/287 |
| 2013/0334277 | A1 * | 12/2013 | Shima | B25C 1/06 318/114 |
| 2016/0303723 | A1 * | 10/2016 | Franz | B25F 5/021 |
| 2018/0141198 | A1 * | 5/2018 | Fan | H02J 7/0069 |
| 2019/0229597 | A1 * | 7/2019 | Büttner | H02K 15/0012 |
| 2020/0130156 | A1 * | 4/2020 | Takeuchi | H02P 29/60 |
| 2021/0023686 | A1 * | 1/2021 | Tan | B25C 1/047 |
| 2021/0060750 | A1 * | 3/2021 | Dittrich | H02K 7/145 |
| 2021/0170559 | A1 * | 6/2021 | Dittrich | B25C 1/06 |
| 2021/0178561 | A1 * | 6/2021 | Dittrich | B25C 1/06 |
| 2021/0187715 | A1 * | 6/2021 | Dittrich | B25C 1/06 |
| 2021/0197351 | A1 * | 7/2021 | Dittrich | H02K 17/08 |
| 2021/0220981 | A1 * | 7/2021 | Dittrich | B25C 1/06 |
| 2021/0229251 | A1 * | 7/2021 | Dittrich | B25C 5/15 |
| 2021/0237243 | A1 * | 8/2021 | Dittrich | B25C 1/06 |
| 2021/0237244 | A1 * | 8/2021 | Bruggmueller | B25C 1/06 |
| 2021/0237245 | A1 * | 8/2021 | Dittrich | B25C 1/04 |
| 2021/0387317 | A1 * | 12/2021 | Dittrich | B25C 1/08 |
| 2022/0258317 | A1 * | 8/2022 | Dittrich | B25C 1/06 |

FOREIGN PATENT DOCUMENTS

| | | |
|---|---|---|
| JP | 2004-510590 A | 4/2004 |
| JP | 2006-095638 A | 4/2006 |
| TW | 516995 B | 11/2003 |
| WO | 2008/094953 A2 | 8/2008 |

* cited by examiner

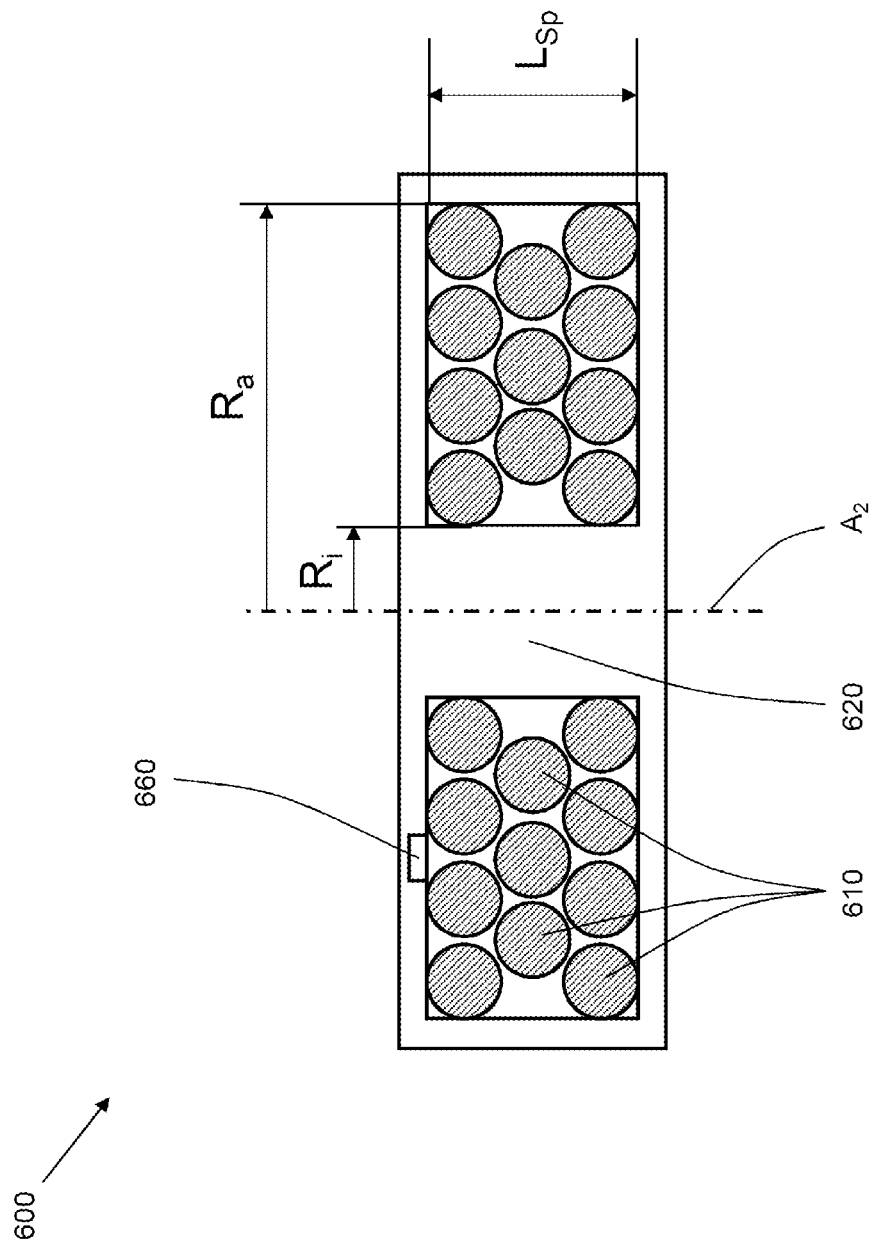

SETTING TOOL

CROSS-REFERENCE TO RELATED APPLICATIONS

This patent application is the U.S. National Stage of International Patent Application No. PCT/EP2019/063937, filed May 29, 2019, which claims the benefit of European Patent Application No. 18176191.7, filed Jun. 6, 2018, which are each incorporated by reference.

The present invention relates to a setting tool for driving fastening elements into a substrate.

Such setting tools usually have a holder for a fastening element, from which a fastening element held therein is transferred into the substrate along a setting axis. For this, a drive-in element is driven toward the fastening element along the setting axis by a drive.

U.S. Pat. No. 6,830,173 B2 discloses a setting tool with a drive for a drive-in element. The drive has an electrical capacitor and a coil. For driving the drive-in element, the capacitor is discharged via the coil, whereby a Lorentz force acts on the drive-in element, so that the drive-in element is moved toward a nail.

The object of the present invention is to provide a setting tool of the aforementioned type with which high efficiency and/or good setting quality are ensured.

The object is achieved by a setting tool for driving fastening elements into a substrate, comprising a holder, which is provided for holding a fastening element, a drive-in element, which is provided for transferring a fastening element held in the holder into the substrate along a setting axis, and a drive, which is provided for driving the drive-in element toward the fastening element along the setting axis, wherein the drive comprises an electrical capacitor, a squirrel-cage rotor arranged on the drive-in element and an excitation coil, which during rapid discharge of the capacitor is flowed through by current and generates a magnetic field that accelerates the drive-in element toward the fastening element, and wherein the setting tool has a means for detecting a temperature of the excitation coil and a control unit which is suitable for controlling an operating sequence of the setting tool in dependence on the detected temperature of the excitation coil. The setting tool can in this case preferably be used in a hand-held manner. Alternatively, the setting tool can be used in a stationary or semi-stationary manner.

In the context of the invention, a capacitor should be understood as meaning an electrical component that stores electrical charge and the associated energy in an electrical field. In particular, the capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded bolt, or the like.

An advantageous embodiment is characterized in that the means for detecting a temperature of the excitation coil comprises a temperature sensor which is arranged on the excitation coil and/or a frame holding the excitation coil.

An advantageous embodiment is characterized in that the means for detecting a temperature of the excitation coil comprises a means for detecting an ohmic resistance of the excitation coil.

An advantageous embodiment is characterized in that the means for detecting a temperature of the excitation coil comprises a means for detecting a time, a means for detecting a process which causes the temperature of the excitation coil to rise, a data memory, in which a standard cooling rate of the excitation coil and the temperature rise caused by the process are stored, and a program for calculating the temperature of the excitation coil, starting from a starting temperature at a starting time, on the basis of the recorded process and the stored temperature rise as well as the recorded time and the stored standard cooling rate. The means for detecting a temperature of the excitation coil preferably comprises an ambient temperature sensor, the starting temperature being a temperature of a surrounding area of the setting tool detected by the ambient temperature sensor. The setting tool also preferably has a means for cooling the excitation coil, an increased cooling rate of the excitation coil being stored in the data memory, and the program for calculating the temperature of the excitation coil using the standard cooling rate in periods in which the means for cooling the excitation coil is not in operation and using the increased cooling rate in periods in which the means for cooling the excitation coil is in operation.

An advantageous embodiment is characterized in that the setting tool has a means for cooling the excitation coil, and the control unit being intended to control the means for cooling the excitation coil in dependence on the detected temperature of the excitation coil. As a result, more driving-in operations are possible before the excitation coil and/or other components of the setting tool overheat In addition, an increase in ohmic resistance of the excitation coil associated with an increase in temperature and an associated drop in efficiency of the drive are reduced or avoided. The means for cooling the excitation coil preferably comprises a rotor, the control unit being intended to control a running time and/or a rotational speed of the rotor in dependence on the detected temperature of the excitation coil. The control unit is particularly preferably intended to increase the running time and/or the speed of the rotor, the higher the temperature of the excitation coil detected.

An advantageous embodiment is characterized in that the capacitor is charged with a charging voltage at the beginning of the rapid discharge, the control unit being suitable for controlling the charging voltage in dependence on the detected temperature of the excitation coil. The charging voltage is preferably all the greater the higher the detected temperature of the excitation coil. This makes it possible to compensate for an increasing ohmic resistance of the excitation coil with increasing temperature.

An advantageous embodiment is characterized in that the control unit is intended to enable a driving-in process in which the drive-in element is accelerated onto the fastening element if the detected temperature of the excitation coil is less than a predetermined maximum temperature and to inhibit the driving-in process if the detected temperature of the excitation coil is greater than the specified maximum temperature. This prevents damage to the excitation coil and/or the soft magnetic frame and/or other components of the drive or the setting tool due to overheating.

An advantageous embodiment is characterized in that the capacitor is charged with a charging voltage at the beginning of the rapid discharge, the control unit being suitable for controlling the charging voltage. The capacitor is preferably charged in a charging process before the rapid discharge, the charging process being controlled by the control unit.

Figure 2:
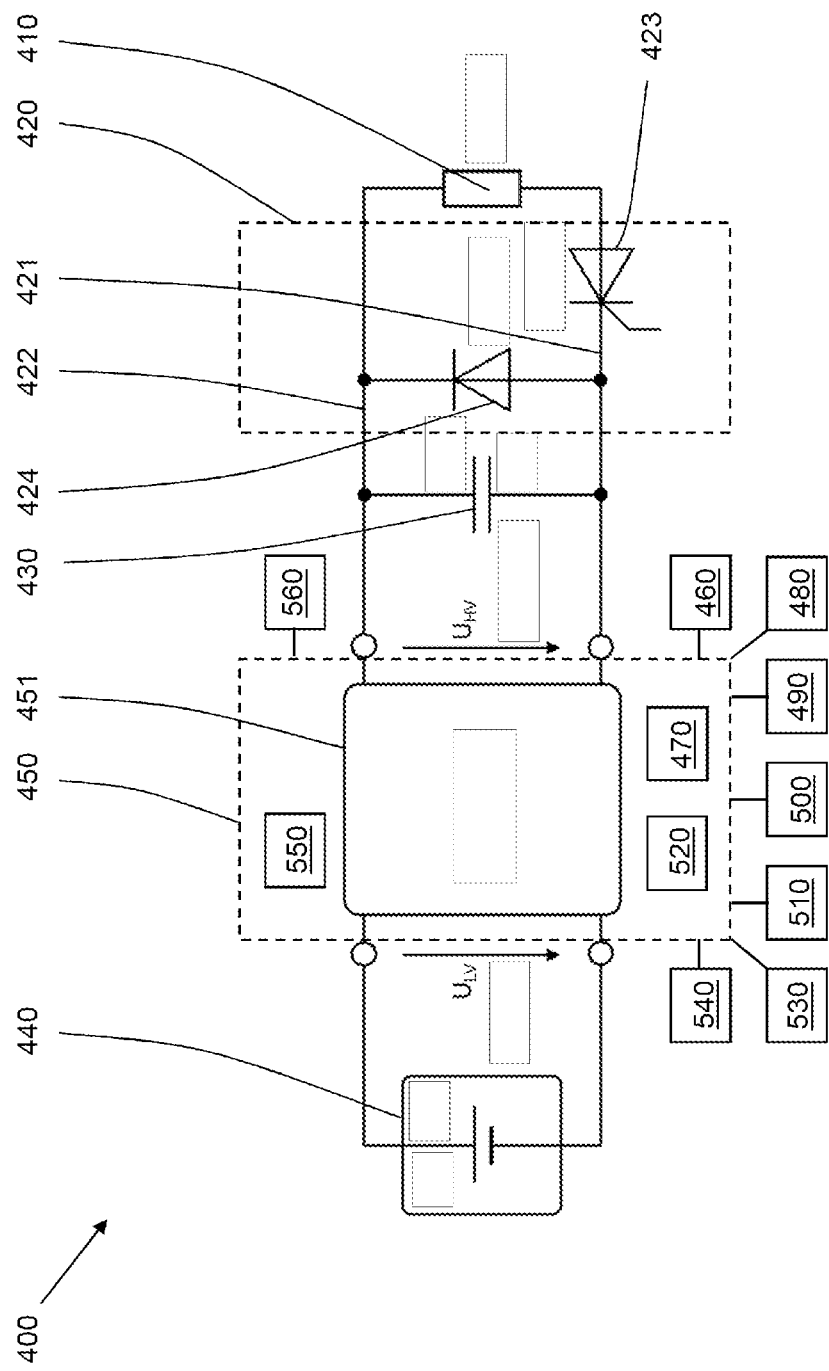

The invention is represented in a number of exemplary embodiments in the drawings, in which:

FIG. 1 shows a longitudinal section through a setting tool,
FIG. 2 shows a circuit diagram of a setting tool and FIG. 3 shows a longitudinal section through an excitation coil.

FIG. 1 illustrates a hand-held setting tool 10 for driving fastening elements into a substrate that is not shown. The setting tool 10 has a holder 20 formed as a stud guide, in which a fastening element 30, which is formed as a nail, is held in order to be driven into the substrate along a setting axis A (to the left in FIG. 1). For the purpose of supplying fastening elements to the holder, the setting tool 10 comprises a magazine 40 in which the fastening elements are held in store individually or in the form of a fastening element strip 50 and are transported to the holder 20 one by one. To this end, the magazine 40 has a spring-loaded feed element, not specifically denoted. The setting tool 10 has a drive-in element 60, which comprises a piston plate 70 and a piston rod 80. The drive-in element 60 is provided for transferring the fastening element 30 out of the holder 20 along the setting axis A into the substrate. In the process, the drive-in element 60 is guided with its piston plate 70 in a guide cylinder 95 along the setting axis A.

The drive-in element 60 is, for its part, driven by a drive, which comprises a squirrel-cage rotor 90 arranged on the piston plate 70, an excitation coil 100, a soft-magnetic frame 105, a switching circuit 200 and a capacitor 300 with an internal resistance of 5 mOhms. The squirrel-cage rotor 90 consists of a preferably ring-like, particularly preferably circular ring-like, element with a low electrical resistance, for example made of copper, and is fastened, for example soldered, welded, adhesively bonded, clamped or connected in a form-fitting manner, to the piston plate 70 on the side of the piston plate 70 that faces away from the holder 20. In exemplary embodiments which are not shown, the piston plate itself is formed as a squirrel-cage rotor. The switching circuit 200 is provided for causing rapid electrical discharging of the previously charged capacitor 300 and conducting the thereby flowing discharge current through the excitation coil 100, which is embedded in the frame 105. The frame preferably has a saturation flux density of at least 1.0 T and/or an effective specific electrical conductivity of at most $10^6$ S/m, so that a magnetic field generated by the excitation coil 100 is intensified by the frame 105 and eddy currents in the frame 105 are suppressed.

In a ready-to-set position of the drive-in element 60 (FIG. 1), the drive-in element 60 enters with the piston plate 70 a ring-like recess, not specifically denoted, of the frame 105 such that the squirrel-cage rotor 90 is arranged at a small distance from the excitation coil 100. As a result, an excitation magnetic field, which is generated by a change in an electrical excitation current flowing through the excitation coil, passes through the squirrel-cage rotor 90 and, for its part, induces in the squirrel-cage rotor 90 a secondary electrical current, which circulates in a ring-like manner. This secondary current, which builds up and therefore changes, in turn generates a secondary magnetic field, which opposes the excitation magnetic field, as a result of which the squirrel-cage rotor 90 is subject to a Lorentz force, which is repelled by the excitation coil 100 and drives the drive-in element 60 toward the holder 20 and also the fastening element 30 held therein.

The setting tool 10 further comprises a housing 110, in which the drive is held, a handle 120 with an operating element 130 formed as a trigger, an electrical energy store 140 formed as a rechargeable battery, a control unit 150, a tripping switch 160, a contact-pressure switch 170, a means for detecting a temperature of the excitation coil 100, formed as a temperature sensor 180 arranged on the frame 105, and electrical connecting lines 141, 161, 171, 181, 201, 301, which connect the control unit 150 to the electrical energy store 140, to the tripping switch 160, to the contact-pressure switch 170, to the temperature sensor 180, to the switching circuit 200 and, respectively, to the capacitor 300. In exemplary embodiments which are not shown, the setting tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the setting tool 10 is pressed against a substrate that is not shown (on the left in FIG. 1), a contact-pressure element, not specifically denoted, operates the contact-pressure switch 170, which as a result transmits a contact-pressure signal to the control unit 150 by means of the connecting line 171. This triggers the control unit 150 to initiate a capacitor charging process, in which electrical energy is conducted from the electrical energy store 140 to the control unit 150 by means of the connecting line 141 and from the control unit 150 to the capacitor 300 by means of the connecting lines 301, in order to charge the capacitor 300. To this end, the control unit 150 comprises a switching converter, not specifically denoted, which converts the electric current from the electrical energy store 140 into a suitable charge current for the capacitor 300. When the capacitor 300 is charged and the drive-in element 60 is in its ready-to-set position illustrated in FIG. 1, the setting tool 10 is in a ready-to-set state. Since charging of the capacitor 300 is only implemented by the setting tool 10 pressing against the substrate, to increase the safety of people in the area a setting process is only made possible when the setting tool 10 is pressed against the substrate. In exemplary embodiments which are not shown, the control unit already initiates the capacitor charging process when the setting tool is switched on or when the setting tool is lifted off the substrate or when a preceding driving-in process is completed.

When the operating element 130 is operated, for example by being pulled using the index finger of the hand which is holding the handle 120, with the setting tool 10 in the ready-to-set state, the operating element 130 operates the tripping switch 160, which as a result transmits a tripping signal to the control unit 150 by means of the connecting line 161. This triggers the control unit 150 to initiate a capacitor discharging process, in which electrical energy stored in the capacitor 300 is conducted from the capacitor 300 to the excitation coil 100 by means of the switching circuit 200 by way of the capacitor 300 being discharged.

To this end, the switching circuit 200 schematically illustrated in FIG. 1 comprises two discharge lines 210, 220, which connect the capacitor 300 to the excitation coil 200 and at least one discharge line 210 of these is interrupted by a normally open discharge switch 230. The switching circuit 200 forms an electrical oscillating circuit with the excitation coil 100 and the capacitor 300. Oscillation of this oscillating circuit back and forth and/or negative charging of the capacitor 300 may potentially have an adverse effect on the efficiency of the drive, but can be suppressed with the aid of a free-wheeling diode 240. The discharge lines 210, 220 are electrically connected, for example by soldering, welding, screwing, clamping or form-fitting connection, to in each case one electrode 310, 320 of the capacitor 300 by means of electrical contacts 370, 380 of the capacitor 300 which are arranged on an end side 360 of the capacitor 300 that faces the holder. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a retaining device or a clamp. In exemplary embodiments which are not shown, the free-wheeling diode is connected electrically in parallel with the discharge switch. In further exemplary embodiments which are not shown, there is no free-wheeling diode provided in the circuit.

For the purpose of initiating the capacitor discharging process, the control unit 150 closes the discharge switch 230 by means of the connecting line 201, as a result of which a discharge current of the capacitor 300 with a high current intensity flows through the excitation coil 100. The rapidly rising discharge current induces an excitation magnetic field, which passes through the squirrel-cage rotor 90 and, for its part, induces in the squirrel-cage rotor 90 a secondary electric current, which circulates in a ring-like manner. This secondary current which builds up in turn generates a secondary magnetic field, which opposes the excitation magnetic field, as a result of which the squirrel-cage rotor 90 is subject to a Lorentz force, which is repelled by the excitation coil 100 and drives the drive-in element 60 toward the holder 20 and also the fastening element 30 held therein. As soon as the piston rod 80 of the drive-in element 60 meets a head, not specifically denoted, of the fastening element 30, the fastening element 30 is driven into the substrate by the drive-in element 60. Excess kinetic energy of the drive-in element 60 is absorbed by a braking element 85 made of a spring-elastic and/or damping material, for example rubber, by way of the drive-in element 60 moving with the piston plate 70 against the braking element 85 and being braked by the latter until it comes to a standstill. The drive-in element 60 is then reset to the ready-to-set position by a resetting tool that is not specifically denoted.

The capacitor 300, in particular its center of gravity, is arranged behind the drive-in element 60 on the setting axis A, whereas the holder 20 is arranged in front of the drive-in element 60. Therefore, with respect to the setting axis A, the capacitor 300 is arranged in an axially offset manner in relation to the drive-in element 60 and in a radially overlapping manner with the drive-in element 60. As a result, on the one hand a small length of the discharge lines 210, 220 can be realized, as a result of which their resistances can be reduced, and therefore an efficiency of the drive can be increased. On the other hand, a small distance between a center of gravity of the setting tool 10 and the setting axis A can be realized. As a result, tilting moments in the event of recoil of the setting tool 10 during a driving-in process are small. In an exemplary embodiment which is not shown, the capacitor is arranged around the drive-in element.

The electrodes 310, 320 are arranged on opposite sides of a carrier film 330 which is wound around a winding axis, for example by metallization of the carrier film 330, in particular by being vapor-deposited, wherein the winding axis coincides with the setting axis A. In exemplary embodiments which are not shown, the carrier film with the electrodes is wound around the winding axis such that a passage along the winding axis remains. In particular, in this case the capacitor is for example arranged around the setting axis. The carrier film 330 has at a charging voltage of the capacitor 300 of 1500 V a film thickness of between 2.5 µm and 4.8 µm and at a charging voltage of the capacitor 300 of 3000 V a film thickness of for example 9.6 µm. In exemplary embodiments which are not shown, the carrier film is for its part made up of two or more individual films which are arranged as layers one on top of the other. The electrodes 310, 320 have a sheet resistance of 50 ohms/□.

A surface of the capacitor 300 has the form of a cylinder, in particular a circular cylinder, the cylinder axis of which coincides with the setting axis A. A height of this cylinder in the direction of the winding axis is substantially the same size as its diameter, measured perpendicularly to the winding axis. On account of a small ratio of height to diameter of the cylinder, a low internal resistance for a relatively high capacitance of the capacitor 300 and, not least, a compact construction of the setting tool 10 are achieved. A low internal resistance of the capacitor 300 is also achieved by a large line cross section of the electrodes 310, 320, in particular by a high layer thickness of the electrodes 310, 320, wherein the effects of the layer thickness on a self-healing effect and/or on a service life of the capacitor 300 should be taken into consideration.

The capacitor 300 is mounted on the rest of the setting tool 10 in a manner damped by means of a damping element 350. The damping element 350 damps movements of the capacitor 300 relative to the rest of the setting tool 10 along the setting axis A. The damping element 350 is arranged on the end side 360 of the capacitor 300 and completely covers the end side 360. As a result, the individual windings of the carrier film 330 are subject to uniform loading by recoil of the setting tool 10. In this case, the electrical contacts 370, 380 protrude from the end surface 360 and pass through the damping element 350. For this purpose, the damping element 350 in each case has a clearance through which the electrical contacts 370, 380 protrude. The connecting lines 301 respectively have a strain-relief and/or expansion loop, not illustrated in any detail, for compensating for relative movements between the capacitor 300 and the rest of the setting tool 10. In exemplary embodiments which are not shown, a further damping element is arranged on the capacitor, for example on the end side of the capacitor that faces away from the holder. The capacitor is then preferably clamped between two damping elements, that is to say the damping elements bear against the capacitor with prestress. In further exemplary embodiments which are not shown, the connecting lines have a rigidity which continuously decreases as the distance from the capacitor increases.

FIG. 2 illustrates an electrical circuit diagram 400 of a setting tool that is not shown any further, for driving fastening elements into a substrate that is not shown. The setting tool has a housing, not shown, a handle, not shown, with an operating element, a holder, not shown, a magazine, not shown, a drive-in element, not shown, and a drive for the drive-in element. The drive comprises a squirrel-cage rotor, not shown, arranged on the drive-in element, an excitation coil 410, a soft-magnetic frame, not shown, a switching circuit 420, a capacitor 430, an electrical energy store 440 designed as a rechargeable battery, and a control unit 450 with a switching converter 451 designed for example as a DC/DC converter. The switching converter 451 has a low-voltage side $U_{LV}$, electrically connected to the electrical energy store 440, and a high-voltage side $U_{HV}$, electrically connected to the capacitor 430.

The switching circuit 420 is provided for causing rapid electrical discharging of the previously charged capacitor 430 and conducting the thereby flowing discharge current through the excitation coil 410. To this end, the switching circuit 420 comprises two discharge lines 421, 422, which connect the capacitor 430 to the excitation coil 420 and at least one discharge line 421 of which is interrupted by a normally open discharge switch 423. A free-wheeling diode 424 suppresses excessive oscillation back and forth of an oscillating circuit which is formed by the switching circuit 420 with the excitation current 410 and the capacitor 430.

When the setting tool is pressed against the substrate, the control unit 450 initiates a capacitor charging process, in which electrical energy is conducted from the electrical energy store 440 to the switching converter 451 of the control unit 450 and from the switching converter 451 to the capacitor 430 in order to charge the capacitor 430. In the process, the switching converter 451 converts the electric current from the electrical energy store 440, at an electrical voltage of for example 22 V, into a suitable charging current for the capacitor 430, at an electrical voltage of for example 1500 V.

Triggered by an actuation of the actuating element that is not shown, the control unit 450 initiates a capacitor discharging process, in which electrical energy stored in the capacitor 430 is conducted from the capacitor 430 to the excitation coil 410 by means of the switching circuit 420 by the capacitor 430 being discharged. For the purpose of initiating the capacitor discharging process, the control unit 450 closes the discharge switch 430, as a result of which a discharge current of the capacitor 430 with a high current intensity flows through the excitation coil 410. As a result, the squirrel-cage rotor, not shown, is subject to a Lorentz force, which is repelled by the excitation coil 410 and drives the drive-in element. The drive-in element is reset to a ready-to-set position by a resetting device that is not shown.

An amount of energy of the current flowing through the excitation coil 410 during the rapid discharge of the capacitor 430 is controlled, in particular steplessly, by the control unit 450, in that a charging voltage ($U_{HV}$) applied to the capacitor 430 is set during and/or at the end of the capacitor charging process and before the beginning of the rapid discharge. An electrical energy stored in the charged capacitor 430, and thus also the amount of energy of the current flowing through the excitation coil 410 during the rapid discharge of the capacitor 430, can be controlled in proportion to the charging voltage and thus by means of the charging voltage. The capacitor is charged during the capacitor charging process until the charging voltage $U_{HV}$ has reached a setpoint value. The charging current is then switched off. If the charging voltage decreases before the rapid discharge, for example due to parasitic effects, the charging current is switched on again until the charging voltage $U_{HV}$ has reached the setpoint value again.

The control unit 450 controls the amount of energy of the current flowing through the excitation coil 410 during the rapid discharge of the capacitor 430 in dependence on a number of control variables. For this purpose, the setting tool comprises a means formed as a temperature sensor 460 for detecting a temperature of the excitation coil 410 and a means for detecting a capacitance of the capacitor, which is designed for example as a calculation program 470 and calculates the capacitance of the capacitor from a profile of a current intensity and an electrical voltage of the charging current during the capacitor charging process. Furthermore, the setting tool comprises a means designed as an acceleration sensor 480 for detecting a mechanical load variable of the setting tool. The setting tool further comprises a means for detecting a driving depth of the fastening element into the substrate, which comprises a proximity sensor 490, for example an optical, capacitive or inductive proximity sensor 490, which comprises a reversing position of the drive-in element that is not shown. The setting tool further comprises a means for detecting a speed of the drive-in element, which has a means designed as a first proximity sensor 500 for detecting a first point in time, at which the drive-in element passes a first position during its movement toward the fastening element, a means designed as a second proximity sensor 510 for detecting a second point in time, at which the drive-in element passes a second position during its movement toward the fastening element, and a means designed as a calculation program 520 for detecting a time difference between the first point in time and the second point in time. The setting tool further comprises an operating element 530, which can be adjusted by a user, and a means designed as a barcode reader 540 for detecting a characteristic variable of a fastening element to be driven in.

The control variables in dependence on which the control unit 450 controls the amount of energy of the current flowing through the excitation coil 410 during the rapid discharge of the capacitor 430 comprise the temperature detected by the temperature sensor 460 and/or the capacitance of the capacitor calculated by the calculation program 470 and/or the load variable of the setting tool detected by the acceleration sensor 480 and/or the driving-in depth of the fastening element detected by the proximity sensor 490 and/or the speed of the drive-in element calculated by the calculation program 520 and/or the adjustment of the operating element 530 adjusted by the user and/or the characteristic variable of the fastening element detected by the barcode reader 540.

Furthermore, the setting tool, preferably the control unit 450, comprises a means 550 for detecting a temperature of the excitation coil. In one exemplary embodiment, the means 550 is a program which processes a signal that the control unit 450 receives from the temperature sensor 460. In a further exemplary embodiment, the means 550 comprises a means for detecting an ohmic resistance of the excitation coil, which has a signal transmitter and a voltmeter. The signal generator generates a measuring current flowing through the excitation coil 410 and the voltmeter measures an electrical voltage thereby dropping across the excitation coil 410. A calculation program calculates the ohmic resistance of the excitation coil 410 from the measurement current and the voltage drop across the excitation coil 410. The means 550 then calculates a difference between the ohmic resistance of the excitation coil 410 thus obtained and a reference resistance, which was recorded in the same way after a relatively long time without setting operation, that is to say at ambient temperature. The means 550 finally calculates from this difference the temperature of the excitation coil 410.

In a further exemplary embodiment, the means 550 comprises a means formed as a timer for recording a time, a means formed as a data receiver for detecting a driving-in process as a process which causes the temperature of the excitation coil to rise, a data memory in which a standard cooling rate of the excitation coil and the temperature rise caused by the process are stored, and a program for calculating the temperature of the excitation coil 410. The means for detecting a driving-in process is designed as an information receiver, which in each case receives information from the control unit 450 about a driving-in process started by the control unit 450. The temperature of the excitation coil 410 is calculated as follows. After the setting tool has not been used for a relatively long time, device electronics of the setting tool are woken up by actuating a main switch, a pressure switch, a trigger switch or a motion sensor. The program for calculating the temperature of the excitation coil 410 then reads in a starting temperature detected by the temperature sensor 460 or an ambient temperature sensor as the actual temperature. The timer is also started. As soon as a first driving-in process is recorded, the temperature rise stored in the data memory is added to the actual temperature and the sum is saved as the new actual temperature. As soon as a further driving-in process is detected, first a temperature drop is calculated from a difference between the actual temperature and the ambient temperature detected by the ambient temperature sensor and the time that has elapsed since the last driving-in process, recorded by the timer, using the standard cooling rate stored in the data memory. The temperature drop is then subtracted from the actual temperature and the temperature rise stored in the data memory is added and the sum is saved as the new actual temperature. After a relatively long time without driving-in operations, for example two hours, the timer is set to zero and the electronics of the setting tool are put into a sleep mode or switched off. The ambient temperature sensor is preferably arranged on a circuit board of the electronics, for example the control unit 450.

The setting tool has a means 560 for cooling the excitation coil 410, which comprises a rotor and is designed for example as a fan or circulation pump for a cooling liquid. The control unit 450 is intended to control the means 560 for cooling the excitation coil 410, for example a running time and/or speed of the rotor, in dependence on the detected temperature of the excitation coil 410. In the exemplary embodiment described above, an increased cooling rate of the excitation coil 410 is stored in the data memory, the program for calculating the temperature of the excitation coil 410 using the standard cooling rate during periods of time in which the means 560 for cooling the excitation coil 410 is not operating and using the increased cooling rate during periods in time in which the means 560 is operating.

The control unit 450 is suitable for controlling further operating sequences of the setting tool in dependence on the detected temperature of the excitation coil 410. For example, the setpoint value for the charging voltage of the capacitor 430 is controlled in dependence on the detected temperature of the excitation coil 410, the setpoint value being all the greater the higher the detected temperature of the excitation coil 410. Furthermore, the control unit 450 only enables a driving-in process if the detected temperature of the excitation coil 410 is lower than a predetermined maximum temperature. By contrast, if the detected temperature of the excitation coil 410 is greater than the predetermined maximum temperature, the driving-in process is inhibited. The means 560 for cooling the excitation coil 410 preferably remains in operation.

FIG. 3 illustrates a longitudinal section through an excitation coil 600. The excitation coil 600 comprises an electrical conductor, preferably made of copper, with a circular cross section, for example, which is wound in several turns 610 around a setting axis $A_2$. Overall, the excitation coil has a substantially cylindrical, in particular circular-cylindrical, outer shape with an outside diameter Ra and a coil length $L_{Sp}$ in the direction of the setting axis $A_2$. In a radially inner region with respect to the setting axis $A_2$, the excitation coil 600 has a clearance 620, which is preferably likewise cylindrical, in particular circular-cylindrical, and defines an inside diameter $R_i$ of the excitation coil.

A means formed as a temperature sensor 660 for detecting a temperature of the excitation coil 600 is arranged on an axial end face of the excitation coil 600 with respect to the setting axis $A_2$ and is connected in a thermally conducting manner to the excitation coil 600, for example by means of a thermal paste. In exemplary embodiments which are not shown, the temperature sensor is arranged on an inner circumference or outer circumference of the excitation coil.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It should be noted that the setting tool according to the invention can also be used for other applications.

The invention claimed is:

1. A setting tool for driving fastening elements into a substrate, comprising a holder for holding a fastening element; a drive-in element for transferring a fastening element held in the holder into the substrate along a setting axis; and, a drive for driving the drive-in element toward the fastening element along the setting axis, wherein the drive comprises an electrical capacitor, a squirrel-cage rotor arranged on the drive-in element, and an excitation coil, wherein current flows through the excitation coil during discharge of the electrical capacitor and generates a magnetic field that accelerates the drive-in element toward the fastening element, and wherein the setting tool has a means for detecting a temperature of the excitation coil, wherein the means for detecting the temperature of the excitation coil comprises a means for detecting a time, a means for detecting a process which causes the temperature of the excitation coil to rise, a data memory, in which a standard cooling rate of the excitation coil and the temperature rise caused by the process are stored, and a program for calculating the temperature of the excitation coil, starting from a starting temperature at a starting time, on a basis of the recorded process and the stored temperature rise as well as the recorded time and the stored standard cooling rate, and a control unit which is suitable for controlling an operating sequence of the setting tool in dependence on the detected temperature of the excitation coil.

2. The setting tool as claimed in claim 1, wherein the means for detecting a temperature of the excitation coil comprises a temperature sensor which is arranged on the excitation coil and/or a frame holding the excitation coil.

3. The setting tool as claimed in claim 2, wherein the setting tool has a means for cooling the excitation coil, and wherein the control unit is intended to control the means for cooling the excitation coil in dependence on the detected temperature of the excitation coil.

4. The setting tool as claimed in claim 2, wherein the electrical capacitor is charged with a charging voltage at the beginning of the rapid discharge, and wherein the control unit is suitable for controlling the charging voltage in dependence on the detected temperature of the excitation coil.

5. The setting tool as claimed in claim 1, wherein the means for detecting a temperature of the excitation coil comprises means for detecting an ohmic resistance of the excitation coil.

6. The setting tool as claimed in claim 5, wherein the setting tool has a means for cooling the excitation coil, and wherein the control unit is intended to control the means for cooling the excitation coil in dependence on the detected temperature of the excitation coil.

7. The setting tool as claimed in claim 5, wherein the electrical capacitor is charged with a charging voltage at the beginning of the rapid discharge, and wherein the control unit is suitable for controlling the charging voltage in dependence on the detected temperature of the excitation coil.

8. The setting tool as claimed in claim 1, wherein the means for detecting a temperature of the excitation coil comprises an ambient temperature sensor, and wherein the starting temperature is a temperature of a surrounding area of the setting tool detected by the ambient temperature sensor.

9. The setting tool as claimed in claim 8, wherein the setting tool has a means for cooling the excitation coil, an increased cooling rate of the excitation coil being stored in the data memory, and the program for calculating the temperature of the excitation coil using the standard cooling rate in periods in which the means for cooling the excitation coil is not in operation and using the increased cooling rate in periods in which the means for cooling the excitation coil is in operation.

10. The setting tool as claimed in claim 8, wherein the setting tool has a means for cooling the excitation coil, and wherein the control unit is intended to control the means for cooling the excitation coil in dependence on the detected temperature of the excitation coil.

11. The setting tool as claimed in claim 1, wherein the setting tool has a means for cooling the excitation coil, an increased cooling rate of the excitation coil being stored in the data memory, and the program for calculating the temperature of the excitation coil using the standard cooling rate in periods in which the means for cooling the excitation coil is not in operation and using the increased cooling rate in periods in which the means for cooling the excitation coil is in operation.

12. The setting tool as claimed in claim 11, wherein the setting tool has a means for cooling the excitation coil, and wherein the control unit is intended to control the means for cooling the excitation coil in dependence on the detected temperature of the excitation coil.

13. The setting tool as claimed in claim 1, wherein the setting tool has a means for cooling the excitation coil, and wherein the control unit is intended to control the means for cooling the excitation coil in dependence on the detected temperature of the excitation coil.

14. The setting tool as claimed in claim 13, wherein the means for cooling the excitation coil comprises a rotor, and wherein the control unit is intended to control a running time and/or a speed of the rotor in dependence on the detected temperature of the excitation coil.

15. The setting tool as claimed in claim 14, wherein the control unit is intended to increase the running time and/or the speed of the rotor, the higher the detected temperature of the excitation coil.

16. The setting tool as claimed in claim 1, wherein the electrical capacitor is charged with a charging voltage at the beginning of the rapid discharge, and wherein the control unit is suitable for controlling the charging voltage in dependence on the detected temperature of the excitation coil.

17. The setting tool as claimed in claim 16, wherein the charging voltage is all the greater the higher the detected temperature of the excitation coil.

18. The setting tool as claimed in claim 1, wherein the control unit is intended to enable a driving-in process in which the drive-in element is accelerated onto the fastening element if the detected temperature of the excitation coil is less than a predetermined maximum temperature and to inhibit the driving-in process if the detected temperature of the excitation coil is greater than the specified maximum temperature.

19. The setting tool as claimed in claim 1, wherein the setting tool has a means for cooling the excitation coil, and wherein the control unit is intended to control the means for cooling the excitation coil in dependence on the detected temperature of the excitation coil.

* * * * *